(12) United States Patent
Shi et al.

(10) Patent No.: US 9,014,123 B2
(45) Date of Patent: Apr. 21, 2015

(54) METHOD FOR CONTROLLING COMPRESSED MODE AND SYSTEM THEREOF

(75) Inventors: Lirong Shi, Shenzhen (CN); Meifang He, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 114 days.

(21) Appl. No.: 13/817,254

(22) PCT Filed: Aug. 20, 2010

(86) PCT No.: PCT/CN2010/076214
§ 371 (c)(1),
(2), (4) Date: Feb. 15, 2013

(87) PCT Pub. No.: WO2012/022050
PCT Pub. Date: Feb. 23, 2012

(65) Prior Publication Data
US 2013/0142164 A1   Jun. 6, 2013

(51) Int. Cl.
| | |
|---|---|
| H04W 4/00 | (2009.01) |
| H04W 24/10 | (2009.01) |
| H04L 5/00 | (2006.01) |
| H04W 36/00 | (2009.01) |
| H04W 8/24 | (2009.01) |

(52) U.S. Cl.
CPC ............. *H04W 24/10* (2013.01); *H04L 5/0007* (2013.01); *H04W 36/0083* (2013.01); *H04W 8/24* (2013.01)

(58) Field of Classification Search
CPC ............................ H04L 5/0007; H04W 24/10
USPC .................. 370/328, 329, 348; 455/439, 418
See application file for complete search history.

(56) References Cited

U.S. PATENT DOCUMENTS

| | | | |
|---|---|---|---|
| 2006/0183482 A1* | 8/2006 | Ueda ............................. | 455/439 |
| 2007/0019575 A1 | 1/2007 | Shaheen | |
| 2007/0086420 A1* | 4/2007 | Schotten et al. .............. | 370/348 |
| 2009/0203381 A1 | 8/2009 | Ueda | |

(Continued)

FOREIGN PATENT DOCUMENTS

| | | |
|---|---|---|
| CN | 1464665 A | 12/2003 |
| CN | 1753561 A | 3/2006 |

(Continued)

OTHER PUBLICATIONS

International Search Report in international application No. PCT/CN2010/076214, mailed on May 26, 2011.

(Continued)

*Primary Examiner* — Albert T Chou
(74) *Attorney, Agent, or Firm* — Brundidge & Stanger, P.C.

(57) ABSTRACT

A method for controlling compressed mode is disclosed in the disclosure, includes: a network side obtains multi-carrier frequency measurement capability of a User Equipment (UE); when the UE needs to switch among frequencies/systems, the network side determines and controls whether the UE starts a compressed mode or not according to the multi-carrier frequency measurement capability of the UE. A system for controlling compressed mode is accordingly disclosed in the disclosure. By applying the disclosure, measurement can be implemented without starting the compressed mode when the UE needs to switch among frequencies/systems, thus enhancing the utilization rate of system sources and improving system performance.

15 Claims, 2 Drawing Sheets

(56) References Cited

U.S. PATENT DOCUMENTS

| | | |
|---|---|---|
| 2009/0270103 A1 | 10/2009 | Pani |
| 2012/0063391 A1 | 3/2012 | Shaheen |
| 2012/0064873 A1* | 3/2012 | Farnsworth .................... 455/418 |
| 2013/0044690 A1* | 2/2013 | Shaheen ........................ 370/328 |

FOREIGN PATENT DOCUMENTS

| | | |
|---|---|---|
| CN | 1842203 A | 10/2006 |
| EP | 1691568 A1 | 8/2006 |
| EP | 2117181 A1 | 11/2009 |
| WO | 2010032675 A1 | 3/2010 |

OTHER PUBLICATIONS

English Translation of the Written Opinion of the International Search Authority in international application No. PCT/CN2010/076214, mailed on May 26, 2011.

Signaling UE search capability in 4C HSDPA Aug. 17, 2010.

Supplementary European Search Report in European application No. 10856048.3, mailed on Nov. 13, 2014.

* cited by examiner

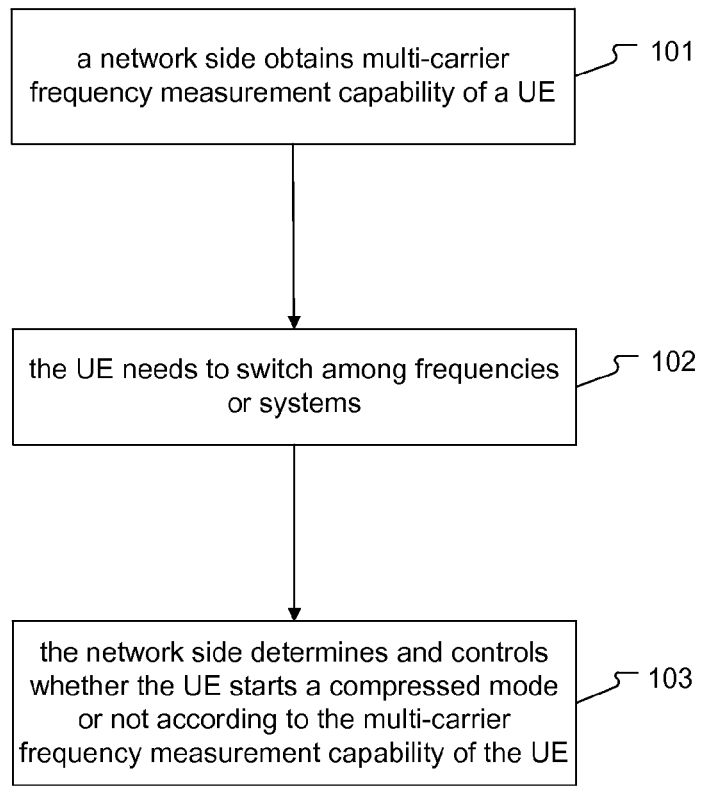
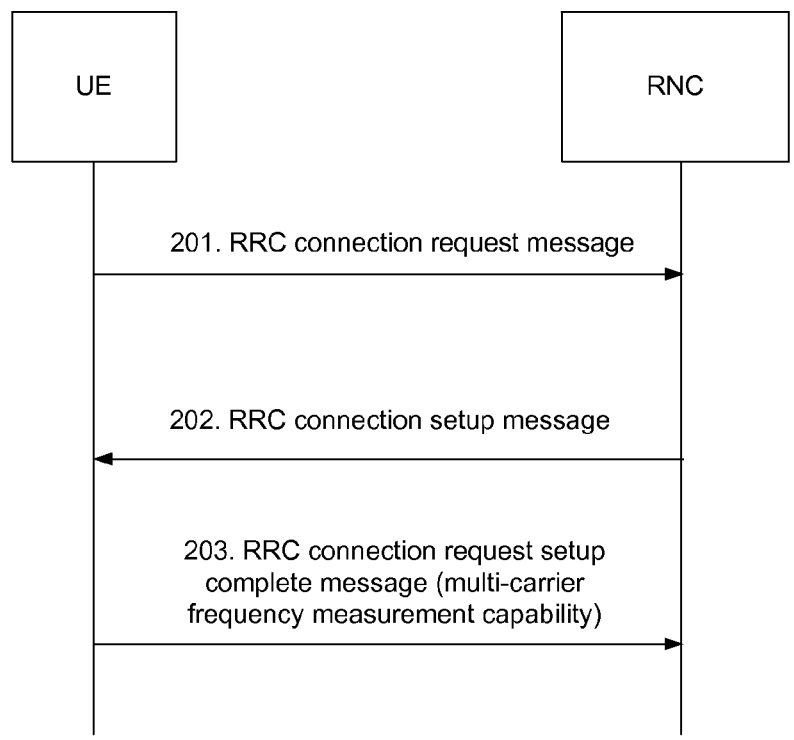

METHOD FOR CONTROLLING COMPRESSED MODE AND SYSTEM THEREOF

TECHNICAL FIELD

The disclosure relates a multi-carrier frequency High-Speed Downlink Packet Access (HSDPA) technology, and more particularly, to a method and system for controlling compressed mode.

BACKGROUND

In an existing cellular mobile telecommunication system, in order to enhance the utilization rate of frequency spectrum resources and the capability of the whole system and restrict the transmitting power of a base station in the system within a cell, when a User Equipment (UE) moves from a cell to another cell, signals received by the UE from an original cell inevitably become increasingly weak while the received signals in the cell which the UE is entering are becoming increasingly strong. The UE needs to switch to a new cell to maintain the communication quality of the UE.

Under a Frequency Division Duplexing (FDD) mode, in order to perform switching among different frequencies, switching from FDD to Time Division Duplexing (TDD) or switching among systems, measurement needs to be performed for a target cell of switching. If downlink signals are always occupied in time domain, downlink data needs to be received continuously. For a UE with only one set of transceiver, a mechanism, which is a compressed mode, is needed to be able generate a certain idle time slot in a downlink radio frame.

Downlink compressed mode is used for forming a data transmission "gap" for a period of time by using various techniques in a data frame of an air interface. In this gap, a base station transmits no data, and a UE receives no data. In this way, the UE may perform measurement by using the period of time.

When the downlink compressed mode is used, if an uplink frequency of a UE is being transmitted, and a measured frequency is relatively close to the uplink frequency, then the measured frequency may be interfered by uplink transmitting frequency. In order to ensure measurement accuracy, uplink transmission is also needed to be stopped at the moment. This is the uplink compressed mode.

Generally, the uplink compressed mode applies the following methods: reducing spreading factors by half, punching and performing scheduling by a higher layer etc. The downlink compressed mode may apply the methods above except punching. Since the compressed mode may influence the system performance, receivers of some UEs are capable of receiving signals of a plurality of carrier frequencies gradually, thus measurement may be performed among frequencies and systems without starting the compressed mode.

Downlink secondary carrier frequency measurement of a terminal supports Dual-Carrier HSDPA (DC-HSDPA) function is expressed by an information element of Adjacent Frequency measurements without compressed mode. If the information element is included, then a compressed mode is not needed to be started when a UE is measuring adjacent carrier frequencies. If the information element is not included, then a compressed mode is needed to be started when a UE is measuring adjacent carrier frequencies. At the same time, the downlink secondary carrier frequency measurement of the terminal supports DC-HSDPA function is also expressed by an information element of Inter-band Frequency measurements without compressed mode. If the information element is included, then a compressed mode is not needed to be started when a UE is measuring carrier waves of different frequency bands. If the information element is not included, then a compressed mode is needed to be started when a UE is measuring carrier waves of different frequency bands.

With the development of technologies, the multi-carrier frequency HSDPA technology is expected to be introduced into the existing systems. The technology enables a terminal to receive data on three or four carrier waves by using the HSDPA technology so as to multiply the rate of downlink data. Taking a four-carrier frequency HSDPA (4C-HSDPA) system for example, there are four carrier waves (a primary carrier wave and three secondary carrier waves) on downlink, and a terminal needs to be able to monitor the three secondary carrier waves. If the secondary carrier waves which can be detected by the terminal are less than three, a UE may not be able to change a serving cell timely in some areas covered by the 4C-HSDPA technology, thus causing a call drop easily.

To solve the problem above, in the multi-carrier frequency HSDPA technology, when switching needs to be performed among systems or frequencies, a UE needs to start a compressed mode to perform corresponding switching among systems or frequencies, thus resulting in a relatively low utilization rate of system resources and influencing the system performance.

SUMMARY

In view of this, the main purpose of the disclosure is to provide a method and system for controlling compressed mode so as to enhance the utilization rate of system resources and improve system performance.

To achieve the purpose above, a technical solution of the disclosure is provided as follows:

a method for controlling compressed mode, may include:

a network side obtains multi-carrier frequency measurement capability of a UE;

when the UE needs to switch among frequencies/systems, the network side determines and controls whether the UE starts a compressed mode or not according to the multi-carrier frequency measurement capability of the UE.

The network side obtains multi-carrier frequency measurement capability of a UE may include:

sending, by a network side, a multi-carrier frequency measurement capability enquiry command to a UE;

returning, by the UE, multi-carrier frequency measurement capability of the UE to the network side according to the multi-carrier frequency measurement capability enquiry command, or notifying, by the UE, multi-carrier frequency measurement capability of the UE to the network side initiatively.

The UE notifies its multi-carrier frequency measurement capability to the network side initiatively may include: notifying, by the UE, multi-carrier frequency measurement capability of the UE to the network side via a newly added Radio Resource Control (RRC) message, or notifying multi-carrier frequency measurement capability of the UE to the network side by expanding an existing RRC message.

The UE expands an existing RRC message and notifies its multi-carrier frequency measurement capability to the network side may include: expanding, by the UE, a radio network resource connection setup complete message or a radio equipment capability information message so that the radio network resource connection setup complete message or the radio equipment capability information message includes an indication information element of multi-carrier frequency measurements number without compressed mode.

wherein UE expands an existing RRC message and notifies its multi-carrier frequency measurement capability to the network side may include: performing, by the UE, no expansion to the radio network resource connection setup complete message or the radio equipment capability information message when the multi-carrier frequency measurements number without compressed mode is equal to 1.

The network side determines whether the UE starts a compressed mode or not may include: if the multi-carrier frequency measurement capability of the UE satisfies requirements of measurement among frequencies/systems, the UE is not needed to start a compressed mode; if the multi-carrier frequency measurement capability of the UE does not satisfy the measurement requirements, the UE needs to start a compressed mode; or if radio quality satisfies a preset condition and the multi-carrier frequency measurements number without compressed mode of the UE has satisfied the requirements of measurement among frequencies/systems, the UE is not needed to start the compressed mode.

wherein when a message notified by the UE to the network side indicates that the multi-carrier frequency measurements number without compressed mode is equal to 1 or does not comprise the indication information element of multi-carrier frequency measurements number without compressed mode, and indication of adjacent frequency measurements without compressed mode is comprised or indication of inter-band frequency measurements without compressed mode is comprised, the UE is not needed to start the compressed mode for measurement on a frequency indicated by the adjacent carrier frequency measurements without compressed mode or the inter-band frequency measurements without compressed mode.

wherein when the value of the indication information element of the multi-carrier frequency measurement capability is 2, it may indicate that other 2 carrier frequencies can be measured without starting a compressed mode.

wherein when the value of the indication information element of the multi-carrier frequency measurement capability is 3, it may indicate that other 3 carrier frequencies can be measured without starting a compressed mode.

The network side may be a Radio Network Controller (RNC).

A system for controlling compressed mode, may include a network side and a UE, wherein the network side is configured to obtain multi-carrier frequency measurement capability of the UE, and, when the UE needs to switch among frequencies/systems, determine and control whether the UE starts a compressed mode or not according to the multi-carrier frequency measurement capability of the UE.

The network side obtains multi-carrier frequency measurement capability of a UE may include:

sending, by a network side, a multi-carrier frequency measurement capability enquiry command to a UE;

returning, by the UE, multi-carrier frequency measurement capability of the UE to the network side according to the multi-carrier frequency measurement capability enquiry command, or notifying, by the UE, multi-carrier frequency measurement capability of the UE to the network side initiatively.

The UE notifies its multi-carrier frequency measurement capability to the network side initiatively may include: notifying, by the UE, multi-carrier frequency measurement capability of the UE to the network side via a newly added RRC message, or notifying multi-carrier frequency measurement capability of the UE to the network side by expanding an existing RRC message.

The UE expands an existing RRC message and notifies its multi-carrier frequency measurement capability to the network side may include: expanding, by the UE, a radio network resource connection setup complete message or a radio equipment capability information message so that the radio network resource connection setup complete message or the radio equipment capability information message includes an indication information element of multi-carrier frequency measurements number without compressed mode.

The network side determines whether the UE starts a compressed mode or not may include: if the multi-carrier frequency measurement capability of the UE satisfies requirements of measurement among frequencies/systems, the UE is not needed to start a compressed mode; if the multi-carrier frequency measurement capability of the UE does not satisfy the measurement requirements, the UE needs to start a compressed mode; or if radio quality satisfies a preset condition and the multi-carrier frequency measurements number without compressed mode of the UE has satisfied the requirements of measurement among frequencies/systems, the UE is not needed to start the compressed mode.

The network side may be a RNC.

According to the method and system for controlling compressed mode of the disclosure, a network side (such as a RNC) obtains multi-carrier frequency measurement capability of a UE; when the UE needs to switch among frequencies/systems, controls the UE to or not to start a compressed mode according to the multi-carrier frequency measurement capability of the UE and current radio quality. By applying the disclosure, measurement can be implemented without starting the compressed mode when the UE needs to switch among frequencies/systems, thus enhancing the utilization rate of system sources and improving system performance.

BRIEF DESCRIPTION OF THE DRAWINGS

FIG. 1 is a flowchart illustrating a method for controlling compressed mode of the disclosure;

FIG. 2 is a flowchart illustrating a method for transmitting UE multi-carrier frequency measurement capability in embodiment 1 of the disclosure;

DETAILED DESCRIPTION

Figure 3:
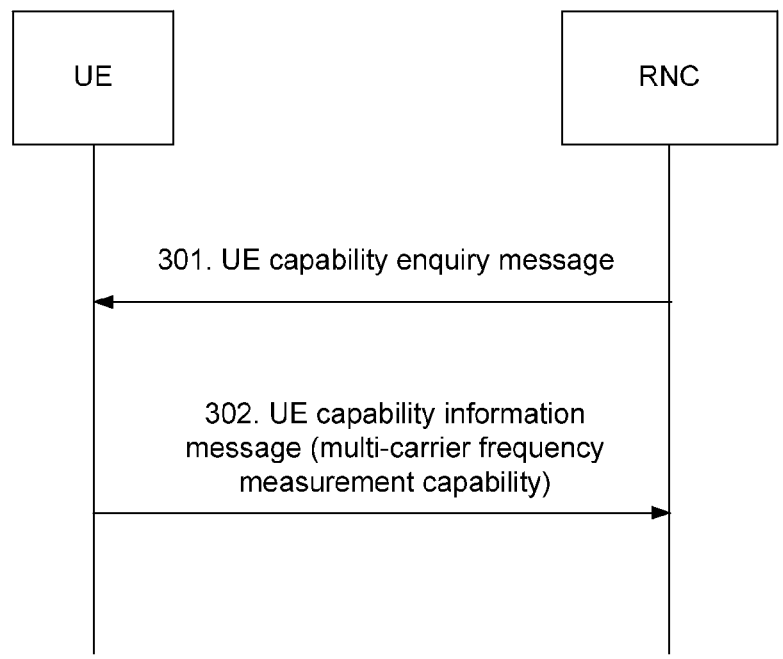
FIG. 3 is a flowchart illustrating a method for transmitting UE multi-carrier frequency measurement capability in embodiment 2 of the disclosure.

The basic idea of the disclosure is that: a network side (such as a RNC) obtains multi-carrier frequency measurement capability of a UE; when the UE needs to switch among frequencies/systems, controls the UE to or not to start a compressed mode according to the multi-carrier frequency measurement capability of the UE and current radio quality.

FIG. 1 is a flowchart illustrating a method for controlling compressed mode of the disclosure. As shown in FIG. 1, the method includes:

step 101: a network side obtains multi-carrier frequency measurement capability of a UE.

Here, a Radio Network Controller (RNC) of the network side obtains the multi-carrier frequency measurement capability of the UE generally and performs corresponding control.

In the disclosure, the multi-carrier frequency measurement capability of the UE is the multi-carrier frequency measurement capability without compressed mode supported by the UE.

Obtaining multi-carrier frequency measurement capability of a UE by a network side may include that: sending, by a network side, a multi-carrier frequency measurement capability enquiry command to a UE; returning, by the UE, multi-carrier frequency measurement capability of the UE to the network side according to the multi-carrier frequency measurement capability enquiry command.

Obtaining multi-carrier frequency measurement capability of a UE by a network side may also include that: notifying, by a UE, multi-carrier frequency measurement capability of the UE to the network side initiatively. Here, the UE may notify its multi-carrier frequency measurement capability to the network side by a newly added RRC message; or the UE may also notify its multi-carrier frequency measurement capability to the network side by expanding an existing RRC message, for example, expands a RRC Connection Setup Complete message or a UE Capability Information message so that the RRC Connection Setup Complete message or the UE Capability Information message includes an indication information element of Multi Frequency measurements Number without compressed mode. The value of the information element is n, which indicates that the UE is able to measure other n carrier frequencies at the same time without starting a compressed mode, wherein n>=1.

In practical applications, an indication information element of Multi Frequency measurements Number without compressed mode supported by the UE may be added in a message, includes multi-carrier frequency capability which is supported, to indicate the multi-carrier frequency measurement capability of the UE. Corresponding protocols are as described in Table 1 and Table 2:

TABLE 1

| Information Element/<br>Group Name | Need | Multi | Type and reference |
|---|---|---|---|
| Multi Frequency measurements Number without compressed mode | Optional (OP) | | (Enumerated (1, 2, 3, . . . )) |

TABLE 2

| Information Element/Group Name | Need | Multi | Type and reference |
|---|---|---|---|
| Multi Frequency measurements Number without compressed mode | Optional (OP) | | (Enumerated (2, 3, . . . )) |

As shown in Table 1 or Table 2, the message includes Multi-carrier Frequency measurements Number without compressed mode, and the value is n, which indicates that the UE is able to measure other n carrier frequencies at the same time without starting a compressed mode, wherein n>=1.

If the message includes Adjacent Frequency measurements without compressed mode and/or Inter-band Frequency measurements without compressed mode, but does not include Multi Frequency measurements Number without compressed mode, it indicates that the number supported by the Adjacent Frequency measurements without compressed mode and/or the Inter-band Frequency measurements without compressed mode is 1. The value of the Adjacent Frequency measurements without compressed mode includes 1, which has the same meaning.

step 102: the UE needs to switch among frequencies/systems.

step 103: the network side determines and controls whether the UE starts a compressed mode or not according to the multi-carrier frequency measurement capability of the UE.

Here, a method for the network side to determine whether a compressed mode is started or not when the UE performs measurement among frequencies or systems may include: if the multi-carrier frequency measurement capability (multi-carrier frequency measurements number without compressed mode) of the UE has satisfied requirements of measurement among frequencies/systems, the compressed mode is not needed to be started, or current radio quality is relatively high (i.e. a preset condition is satisfied, for example, a measured transmission power of a pilot frequency is larger than a preset threshold), the multi-carrier frequency measurements number without compressed mode has satisfied the requirements of measurement among frequencies/systems, then the multi-carrier frequency measurements number is reduced and the compressed mode is not started within the UE capability.

The network side may notify a determination result to the UE when delivering a measurement control message to the UE so as to control the measurement of the UE.

When the network side determines that the UE needs to start the compressed mode, corresponding compressed mode information is needed to be included in the measurement control message.

The disclosure further provides a system for controlling compressed mode. The system includes a network side and a UE, wherein the network side is configured to obtain multi-carrier frequency measurement capability of the UE, and, when the UE needs to switch among frequencies/systems, determine and control whether the UE starts a compressed mode or not according to the multi-carrier frequency measurement capability of the UE.

The network side obtains multi-carrier frequency measurement capability of a UE includes:

sending, by the network side, a multi-carrier frequency measurement capability enquiry command to the UE;

returning, by the UE, multi-carrier frequency measurement capability of the UE to the network side according to the multi-carrier frequency measurement capability enquiry command, or notifying, by the UE, multi-carrier frequency measurement capability of the UE to the network side initiatively;

the UE notifies its multi-carrier frequency measurement capability to the network side initiatively includes: notifying, by the UE, multi-carrier frequency measurement capability of the UE to the network side via a newly added RRC message, or notifying multi-carrier frequency measurement capability of the UE to the network side by expanding an existing RRC message.

The UE expands an existing RRC message and notifies its multi-carrier frequency measurement capability to the network side includes: expanding, by the UE, a radio network resource connection setup complete message or a radio equipment capability information message so that the radio network resource connection setup complete message or the radio equipment capability information message includes an indication information element of multi-carrier frequency measurements number without compressed mode.

The network side determines whether the UE starts a compressed mode or not includes: if the multi-carrier frequency measurement capability of the UE satisfies requirements of measurement among frequencies/systems, the UE is not needed to start a compressed mode; if the multi-carrier frequency measurement capability of the UE does not satisfy the measurement requirements, the UE needs to start a compressed mode; or if radio quality satisfies a preset condition and the multi-carrier frequency measurements number without compressed mode of the UE has satisfied the requirements of measurement among frequencies/systems, the UE is not needed to start the compressed mode.

The network side is a RNC.

The technical solution of the disclosure is further described in details below according to specific embodiments.

Embodiment 1

FIG. 2 shows a flowchart illustrating a method for transmitting UE multi-carrier frequency measurement capability in embodiment 1 of the disclosure. As shown in FIG. 2, the method includes:

step 201: a UE needs to establish connection with a RNC and initiates a RRC Connection Request message.

step 202: the RNC distributes resources of a RRC stage and sends a RRC Connection Setup message to the UE.

step 203: the UE establishes connection successfully, and sends a RRC Connection Setup Complete message to the RNC. The message includes the multi-carrier frequency measurement capability of the UE.

Embodiment 2

FIG. 3 shows a flowchart illustrating a method for transmitting UE multi-carrier frequency measurement capability in embodiment 2 of the disclosure. As shown in FIG. 3, the method includes:

step 301: a RNC needs to obtain multi-carrier frequency measurement capability information of a UE and initiates a UE Capability Enquiry request to the UE.

step 302: the UE sends its multi-carrier frequency measurement capability to the RNC via a UE Capability Information message.

Embodiment 3

Figure 4:
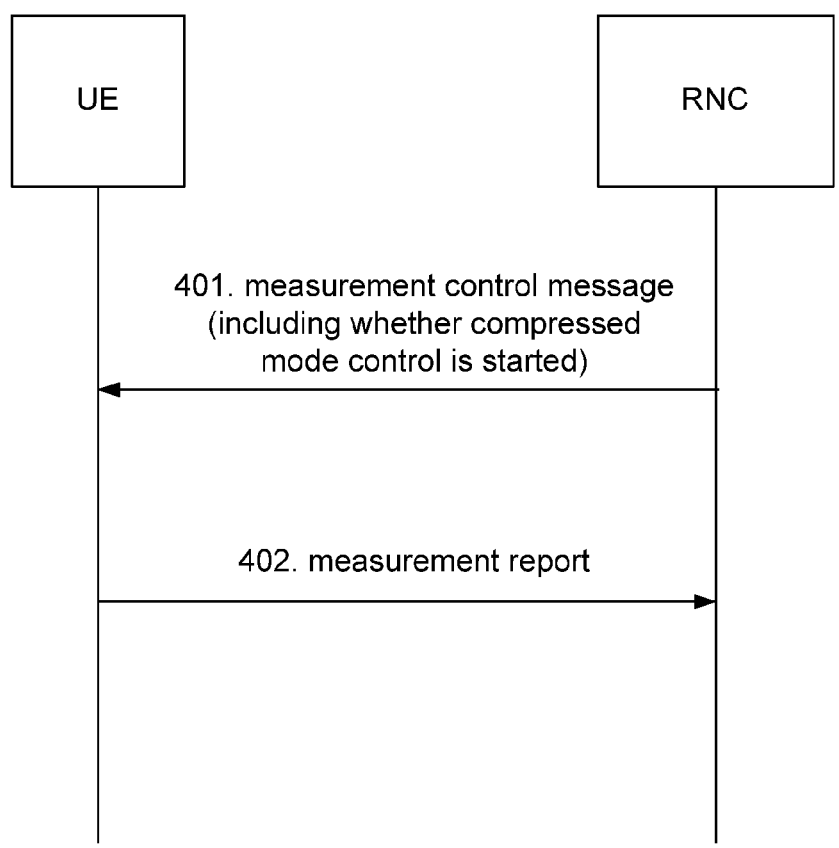
FIG. 4 is a flowchart illustrating a method for delivering measurement control by a RNC in embodiment 3 of the disclosure.

FIG. 4 shows a flowchart illustrating a method for delivering measurement control by a RNC in embodiment 3 of the disclosure. As shown in FIG. 4, the method includes:

step 401: a RNC delivers a measurement control message to a UE based on multi-carrier frequency measurement capability of the UE. The message includes control information indicating whether or not to start a compressed mode.

Here, the RNC determines whether the compressed mode is started or not based on the multi-carrier frequency measurement capability of the UE, and determines how to configure parameters. If the multi-carrier frequency measurement capability (multi-carrier frequency measurements number without compressed mode) reported by the UE has satisfied requirements of measurement among frequencies/systems, the compressed mode is not needed to be started. Otherwise, the compressed mode is started, or current radio quality is relatively high, even if the multi-carrier frequency measurements number without compressed mode reported by the UE satisfies the requirements of measurement among frequencies/systems, then the multi-carrier frequency measurements number is reduced and the compressed mode is not started within the UE capability.

Whether the compressed mode is started or not is controlled by whether an information element "Dedicated Physical Channel (DPCH) Compressed Mode Status Info" is included in the measurement control message. If the UE is required to start the compressed mode, then compressed mode-related information such as a transmission interval mode sequence reconfiguration connection frame number, a transmission interval mode sequence identifier and transmission interval mode sequence status indication and other information are included.

For example, the multi-carrier frequency measurements number reported by the UE is 3 and the carrier frequency number of adjacent area among frequencies and systems is not larger than 3, then the compressed mode is not started when the measurement control message is delivered. If the carrier frequency number of adjacent area among frequencies and systems is greater than 3 and equal to 5 and current radio quality is relatively high, then adjacent areas among frequencies and systems are reduced so that the number of other measured carrier frequencies is not larger than 3 and the compressed mode is not started when the measurement control message is delivered; if the current radio quality is low, then the adjacent areas among frequencies and systems are not reduced, and the compressed mode is started when the measurement control message is delivered.

step 402: the UE performs corresponding measurement according to measurement control and performs measurement reporting when a reporting condition is satisfied.

Those skilled in the art should understand that the modules or steps of the disclosure may be implemented by general computing devices and centralized in a single computing device or distributed in a network consisting of multiple computing devices. Optionally, the modules or steps may be implemented by program codes executable by the computing devices, so that they may be stored in a storage device and executed by the computing device, or respectively made into integrated circuit modules or a single integrated circuit module. By doing so, the disclosure is not limited to any specific combination of hardware and software.

The above are only preferred embodiments of the disclosure and should not be used to limit the disclosure.

The invention claimed is:

1. A method for controlling compressed mode, wherein the method comprises:

obtaining, by a network side, multi-carrier frequency measurement capability of a User Equipment (UE);

determining and controlling, by the network side, whether the UE starts a compressed mode or not according to the multi-carrier frequency measurement capability of the UE when the UE needs to switch among frequencies or systems, wherein the multi-carrier frequency measurement capability is indicated by an indication information element with a value of n>1, wherein the indication information element is a multi-carrier frequency measurements number without compressed mode that indicates that the UE is able to measure, in addition to a primary carrier frequency, other n carrier frequencies at the same time without starting a compressed mode.

2. The method according to claim 1, wherein the obtaining by the network side multi-carrier frequency measurement capability of a UE comprises:

sending, by a network side, a multi-carrier frequency measurement capability enquiry command to a UE;

returning, by the UE, multi-carrier frequency measurement capability of the UE to the network side according to the multi-carrier frequency measurement capability enquiry command, or notifying, by the UE, multi-carrier frequency measurement capability of the UE to the network side initiatively.

3. The method according to claim 2, wherein the notifying by the UE its multi-carrier frequency measurement capability to the network side initiatively comprises: notifying, by the UE, multi-carrier frequency measurement capability of the UE to the network side via a newly added Radio Resource Control (RRC) message, or notifying multi-carrier frequency measurement capability of the UE to the network side by expanding an existing RRC message.

4. The method according to claim 3, wherein the expanding an existing RRC message and notifying by the UE its multi-carrier frequency measurement capability to the network side comprises: expanding, by the UE, a radio network resource connection setup complete message or a radio equipment capability information message so that the radio network resource connection setup complete message or the radio equipment capability information message includes an indication information element of the multi-carrier frequency measurements number without compressed mode.

5. The method according to claim 2, wherein the network side is a RNC.

6. The method according to claim 1, wherein the determining by the network side whether the UE starts a compressed mode or not comprises: if the multi-carrier frequency measurement capability of the UE satisfies requirements of measurement among frequencies or systems, the UE is not needed to start a compressed mode; if the multi-carrier frequency measurement capability of the UE does not satisfy the measurement requirements, the UE needs to start a compressed mode; or if radio quality satisfies a preset condition and the multi-carrier frequency measurements number without compressed mode of the UE has satisfied the requirements of measurement among frequencies or systems, the UE is not needed to start the compressed mode.

7. The method according to claim 1, herein the network side is a Radio Network Controller (RNC).

8. The method according to claim 1, wherein when the value of the indication information element is 2, it is indicated that other 2 carrier frequencies can be measured without starting a compressed mode.

9. The method according to claim 1, wherein when the value of the indication information element is 3, it is indicated that other 3 carrier frequencies can be measured without starting a compressed mode.

10. A system for controlling compressed mode, comprises a network side and a UE, wherein the network side is configured to obtain multi-carrier frequency measurement capability of the UE, and, when the UE needs to switch among frequencies or systems, determine and control whether the UE starts a compressed mode or not according to the multi-carrier frequency measurement capability of the UE, wherein the multi-carrier frequency measurement capability is indicated by an indication information element with a value of n>1, wherein the indication information element is a multi-carrier frequency measurements number without compressed mode that indicates that the UE is able to measure, in addition to a primary carrier frequency, other n carrier frequencies at the same time without starting the compressed mode.

11. The system according to claim 10, wherein the obtaining by the network side multi-carrier frequency measurement capability of a UE comprises:

sending, by a network side, a multi-carrier frequency measurement capability enquiry command to a UE;

returning, by the UE, multi-carrier frequency measurement capability of the UE to the network side according to the multi-carrier frequency measurement capability enquiry command, or notifying, by the UE, multi-carrier frequency measurement capability of the UE to the network side initiatively.

12. The system according to claim 11, wherein the notifying by the UE its multi-carrier frequency measurement capability to the network side initiatively comprises: notifying, by the UE, multi-carrier frequency measurement capability of the UE to the network side via a newly added RRC message, or notifying multi-carrier frequency measurement capability of the UE to the network side by expanding an existing RRC message.

13. The system according to claim 12, wherein the expanding an existing RRC message and notifying by the UE its multi-carrier frequency measurement capability to the network side comprises: expanding, by the UE, a radio network resource connection setup complete message or a radio equipment capability information message so that the radio network resource connection setup complete message or the radio equipment capability information message includes an indication information element of the multi-carrier frequency measurements number without compressed mode.

14. The system according to claim 10, wherein the determining by the network side whether the UE starts a compressed mode or not comprises: if the multi-carrier frequency measurement capability of the UE satisfies requirements of measurement among frequencies or systems, the UE is not needed to start a compressed mode; if the multi-carrier frequency measurement capability of the UE does not satisfy the measurement requirements, the UE needs to start a compressed mode; or if radio quality satisfies a preset condition and the multi-carrier frequency measurements number without compressed mode of the UE has satisfied the requirements of measurement among frequencies or systems, the UE is not needed to start the compressed mode.

15. The system according to claim 10, wherein the network side is a RNC.

* * * * *